Jan. 13, 1925.
W. J. SPIRO
ACCELEROMETER
Filed June 20, 1922
1,523,302
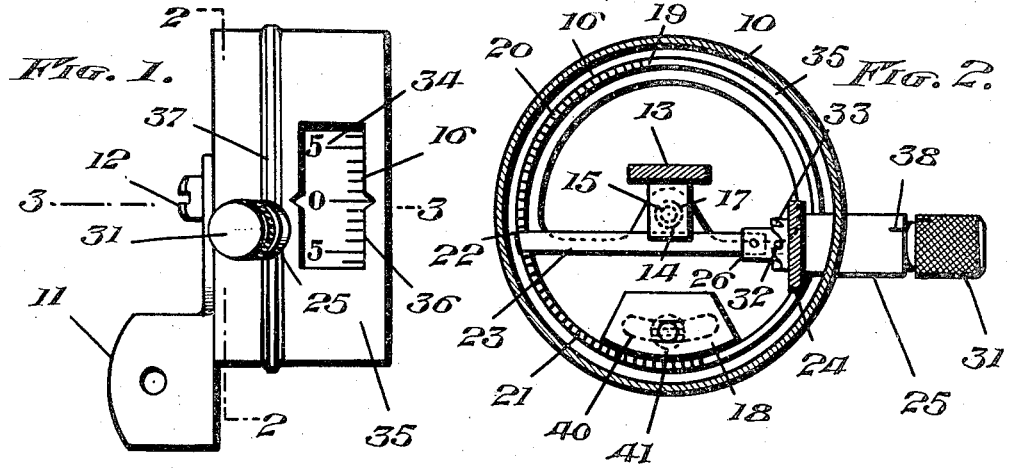
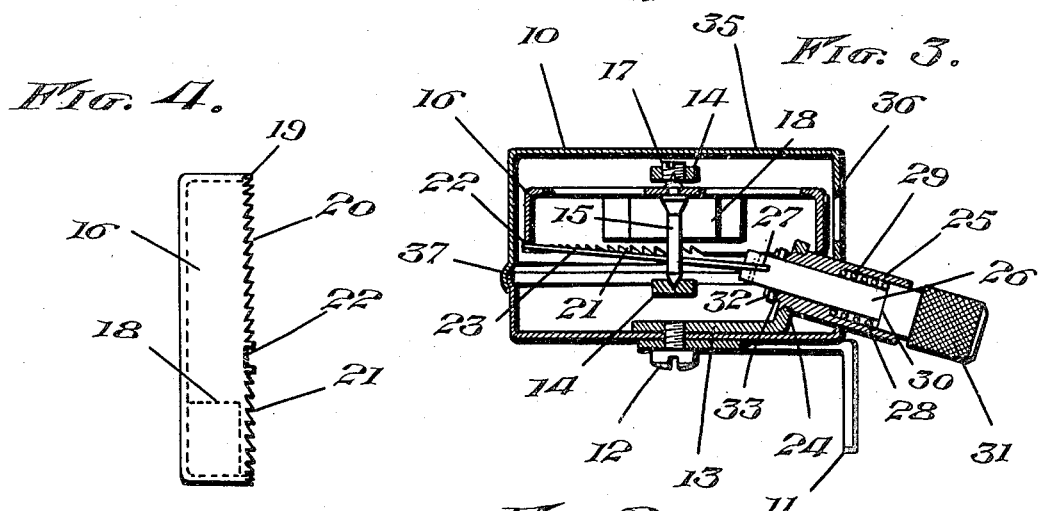
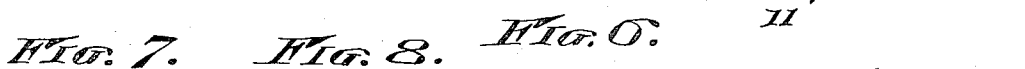
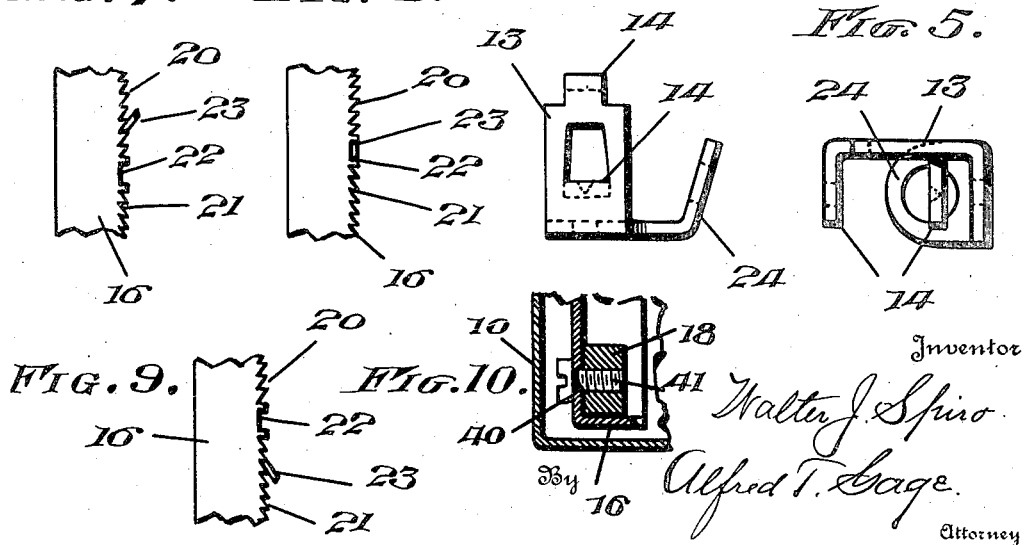
Inventor
Walter J. Spiro
Alfred T. Gage
By
Attorney Patented Jan. 13, 1925.

1,523,302

UNITED STATES PATENT OFFICE.

WALTER J. SPIRO, OF WHITE PLAINS, NEW YORK.

ACCELEROMETER.

Application filed June 20, 1922. Serial No. 569,651.

*To all whom it may concern:*

Be it known that I, WALTER J. SPIRO, a citizen of the United States, residing at White Plains, in the county of Westchester and State of New York, have invented certain new and useful Improvements in Accelerometers, of which the following is a specification.

This invention relates to an accelerometer, and particularly to a device adapted for use upon a motor vehicle to indicate the rate of engine acceleration when started and also the rate of brake retardation when stopping.

The invention has for an object to provide a novel and improved construction comprising a weight member mounted for movement in the direction of travel of a vehicle and controlling indicating means, together with a device for retaining and releasing said member and indicating means.

A further object of the invention is to present a new construction of retaining device embodying oppositely disposed teeth and a cooperating engaging member whereby the indicating weight member may be held at its greatest degree of travel in either direction and released for restoration when desired.

Another object of the invention is to provide a simple and efficient construction wherein the weight member is adjustably mounted relative to the indicating means so that said means may be set at zero independent of the inclination of the support upon which the instrument is mounted.

Other and further objects and advantages of the invention will be hereinafter set forth and the novel features thereof defined by the appended claims.

In the drawing—

Figure 1 is a front elevation of the device;

Figure 2 is a vertical section on line 2—2 of Figure 1;

Figure 3 is a horizontal section on line 3—3 of Figure 1;

Figure 4 is a detail elevation of the weight wheel;

Figure 5 is a top plan of the pivoting bracket;

Figure 6 is a rear elevation thereof;

Figures 7, 8 and 9 are diagramatic details showing the different positions of the retaining pawl relative to the weight wheel; and Figure 10 is a detail section of the adjustable weight.

Like numerals refer to like parts in the several figures of the drawing.

The numeral 10 designates a supporting casing which may be of any desired character or configuration and is mounted upon a vehicle or moving part in any preferred manner, such as the bracket 11 shown in Figure 1. This bracket may be secured to the case by a screw 12 which is also threaded into a pivoting frame 13 upon the inner face of the case. This frame is formed with angularly disposed pivoting arms 14 adapted to receive the horizontal pivot 15 secured to the weight wheel 16. For the purpose of adjusting the bearing one of these arms may be provided with a pivot screw 17 threaded therein in the usual manner. The wheel is provided with an eccentrically disposed weight 18 of any desired character to influence its rotary movement.

The wheel is also formed of cup-shape and a portion of its free edge 19 provided with teeth 20 and 21 disposed in opposite directions from an intermediate holding seat 22. The teeth and seat cooperate with a retaining pawl 23 mounted in an angularly disposed arm 24 from the pivoting frame 13. This mounting is herein shown as comprising a sleeve 25 secured to the arm and carrying a rotatable detent shaft 26 which is slotted at its inner end 27 to receive the pawl 23. This pawl is formed as a flat spring and rigidly secured to the shaft. The shaft is normally projected outward by a spring 28 disposed in a chamber 29 in the sleeve and bearing against a shoulder 30 upon the shaft. The outer end of the shaft is provided with a finger piece 31 for its rotation and its inner end with a cross pin 32 adapted to seat in a series of recesses or sockets 33 formed at the inner end of the sleeve so as to retain the shaft in its adjusted position. It is desirable, but not essential, to dispose the support arm 24 at an acute angle to the pivot of the wheel which causes the flat spring pawl to move vertically, when the detent shaft is turned, a distance equal to the width of the central seat so that the pawl will engage the first ratchet tooth upon the wheel.

The periphery of the wheel opposite its toothed edge is provided with indicating characters 34 extending in reversed directions from a zero or point of rest thereon, and the enclosing cap 35 is formed with a sight opening 36 to clearly reveal the indications to the operator of the vehicle. This cap is frictionally secured to the casing 10 by an overlapping flange 37 which permits its convenient removal whenever desired. The sleeve 25 may be provided with an indication 38 cooperating the indications upon the finger piece 31 to show the position of the pawl relative to the wheel teeth. The board or portion of the vehicle upon which this instrument is supported may be vertical or disposed at different inclinations, and to compensate therefor the weight 18 is adjustably mounted upon the wheel and shifted to bring the characters 34 at zero when the device is placed in position. This may be accomplished by an arcuate slot 40 in the wheel through which a clamping screw 41 passes and engages the weight, as shown in Figures 2 and 10. The device is adjusted to the inclination of its support when mounted thereon, and is designed for use when the machine is in a substantially level position.

With the pawl in the position shown by Figure 7 for the engine acceleration test the inertia weight will cause the wheel to rotate as the vehicle increases in speed and the pawl rides over the teeth and retains the wheel at its extreme of travel. It may be released therefrom by inward pressure upon the finger piece and turning thereof to dispose a flat face of the pawl next the teeth over which it rides as the wheel is restored to zero position by gravity, where it is locked by the pawl entering the seat, as in Figure 8. If it be desired to hold the wheel against any movement, which is its normal position at rest, the pawl is shifted into the seat intermediate the ratchet teeth by proper rotation of the finger piece, as shown in Figure 8. If the brake efficiency is to be tested through the retardation when stopping, the pawl is shifted to the opposite teeth as indicated in Figure 9, and operates as before described.

The device thus indicates the rate of acceleration of a motor car when starting and also the rate of retardation when stopping as the weight wheel is disposed to swing parallel to the path of travel of the car and swings to a greater extent for rapid acceleration than for slow acceleration, and likewise for retardation in stopping the car by reduction of speed or application of the brake. The extreme position to which the wheel swings is shown by the indications and the pawl prevents the return thereof to normal position when the car has reached its ultimate speed. The acceleration rate is an accurate indication of the efficiency of the motor when compared with the known standard rate of acceleration, and similarly the retardation rate is an indication of the efficiency of the brakes. The retaining pawl is preferably formed flat and lies in a vertical plane when in the holding seat. The support for this pawl being at an acute angle to the axis of the wheel causes the pawl to assume an inclined position when shifted into engagement with either set of teeth through the rotation of the supporting shaft. This movement owing to the disposition of the pawl at an angle to the wheel pivot also shifts or rotates the pawl vertically a distance equal to the width of the seat and causes the pawl to engage the first tooth which renders it unnecessary for the wheel to oscillate through this distance before the first ratchet tooth will engage the pawl. The parts when mounted are adjusted to compensate for the inclination of their support which disposes the indications at zero. The pivoting and supporting frame is adapted to be formed from a single piece bent to the form shown, while the weight wheel comprises a single member carrying the retaining teeth and indicating means which greatly expedites the production and accurate assemblage of the parts.

The construction herein shown provides a simple, efficient and economically manufactured form of the meter, but the invention is not confined thereto as changes and alterations may be made therein without departing from the spirit of the invention.

What I claim is—

1. In an accelerometer, a casing, an oscillating weight member pivoted thereon and provided with indications for engine acceleration and brake retardation extending in opposite directions from its position at rest, and means for retaining said member in either of its operative positions, or in an inoperative position.

2. In an accelerometer, a weight member adapted for movement in opposite directions from a position of rest to indicate acceleration and retardation of a moving part, retaining means on said member extending in opposite directions from said position, and a shiftable device for engaging either retaining means for holding said member against restoring movement.

3. In an accelerometer, a weight member adapted for movement in opposite directions from a position of rest to indicate acceleration and retardation of a moving part, retaining means on said member extending in opposite directions from a seat at said position of rest, and a shiftable device for engaging either of said retaining means or said seat.

4. In an accelerometer, a pivotally mounted weight wheel provided with opposite sets of retaining teeth extending from a position of rest and indications upon its periphery, and a yielding pawl rotatably mounted upon a fixed part to engage either set of said teeth.

5. In a device of the class described, a pivotally mounted weight wheel provided with oppositely disposed teeth, and a pawl device adjustably mounted for engagement with either set of said teeth.

6. In a device of the class described, a pivotally mounted weight wheel provided with oppositely disposed sets of teeth and an intermediate holding seat, and a pawl device adjustably mounted for engagement with either set of said teeth or said seat.

7. In a device of the class described, a pivotally mounted weight wheel provided with oppositely disposed sets of teeth, a yielding pawl to engage said teeth, and a rotatable shaft carrying said pawl and adapted to retain it in shifted position in engagement with either set of teeth.

8. In a device of the class described, a pivotally mounted weight wheel provided with oppositely disposed sets of teeth, a fixed sleeve, a rotatable shaft mounted therein, a pawl carried by said shaft to engage either set of said teeth, and means upon said shaft to engage said sleeve and retain the shaft in shifted position.

9. In a device of the class described, a pivotally mounted weight wheel provided with oppositely disposed sets of teeth, a fixed sleeve, a rotatable shaft mounted to reciprocate therein, pawl carried by said shaft to engage either set of said teeth, and a pin upon said shaft disposed to seat in sockets in said sleeve.

10. In a device of the class described, a pivotally mounted weight wheel provided with oppositely disposed sets of teeth, a fixed sleeve formed with a chamber therein, a rotatable shaft mounted in said sleeve and provided with a shoulder, a spring disposed in said chamber and bearing against said shoulder, a pawl carried by said shaft to engage either set of said teeth, and a cross pin upon the inner end of said shaft adapted to seat in sockets at the end of said sleeve.

11. In a device of the class described, a pivotally mounted weight wheel provided with a holding seat and oppositely disposed sets of teeth, and a flat pawl adjustably mounted at an acute angle to the axis of said wheel to engage said seat or either set of said teeth.

12. In a device of the class described, a pivotally mounted weight wheel provided with a holding seat and oppositely disposed sets of teeth, and a spring pawl rotatably mounted at an acute angle to the axis of said wheel to engage said seat or either set of said teeth.

13. In a device of the class described, a casing, a frame member secured thereon and formed with angularly disposed pivoting arms and a supporting arm at an angle thereto, a weighted wheel disposed in a vertical plane with retaining teeth at its periphery and its shaft mounted horizontally in said pivoting arms, and a pawl mounted upon said supporting arm and cooperating with said teeth.

14. In a device of the class described, a casing, a frame member secured thereto, a cup-shaped weighted wheel pivoted upon said member with its axis in a horizontal plane and having retaining teeth upon its free edge and indications upon its periphery, and a pawl device upon the casing disposed to engage said teeth.

15. In a device of the class described, an oscillating weighted member provided with a holding seat and oppositely disposed sets of teeth, a retaining device located in a vertical plane when in said seat and at an angle thereto when engaging either set of said teeth, and means for adjusting said device.

16. In a device of the class described, a casing, an oscillating weighted member pivoted thereon and provided with indications for engine acceleration and brake retardation extending in opposite directions from its position at rest, means for retaining said member in either of its operative positions or in an inoperative position, and a removable cap for said casing having a sight opening cooperating with said indications.

17. In an accelerometer, a casing, an oscillating weight member pivoted thereon and provided with indications for engine acceleration and brake retardation extending in opposite directions from its position at rest, means for retaining said member in either of its operative positions, or in an inoperative position, and means for adjusting the weight upon the oscillating member to dispose the same at a zero indication when at rest.

In testimony whereof I affix my signature.

WALTER J. SPIRO.